Dec. 15, 1942.  E. M. H. LIPS ET AL  2,305,355
ELECTRICAL APPARATUS
Filed Aug. 4, 1939  2 Sheets—Sheet 1
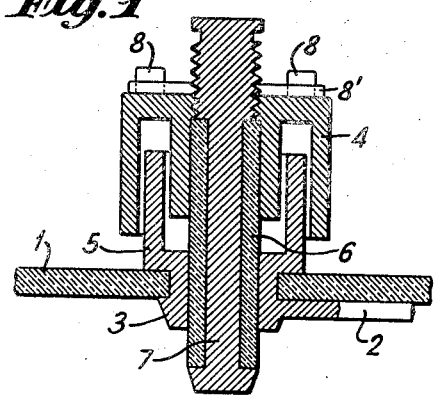
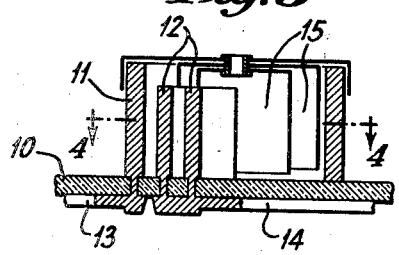
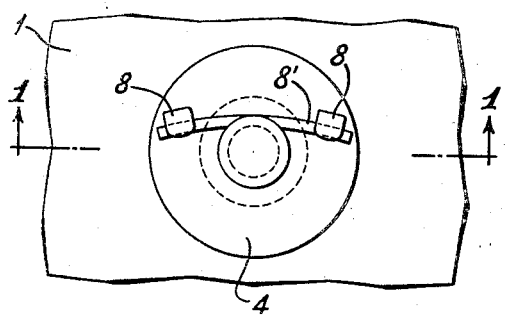
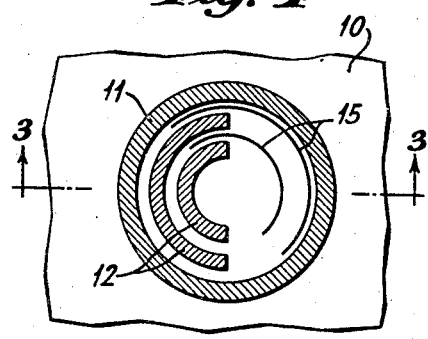
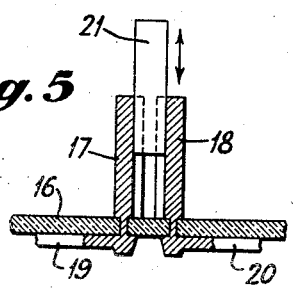
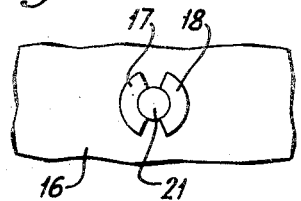
INVENTORS
EDUARD MARIA HENRICUS LIPS,
JOHANNES NATHANAEL HIENSCH,
ALEXANDRE HOROWITZ,
HENRI BLOK AND
PIETER HENDRIK JOHANNES BROUWER
BY
*H. S. Srower*
ATTORNEY.

Dec. 15, 1942.  E. M. H. LIPS ET AL  2,305,355
ELECTRICAL APPARATUS
Filed Aug. 4, 1939  2 Sheets-Sheet 2
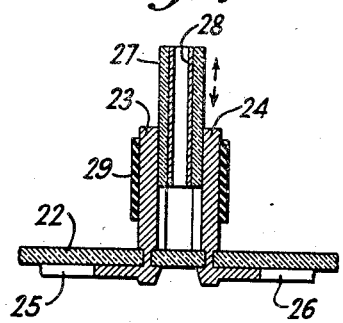
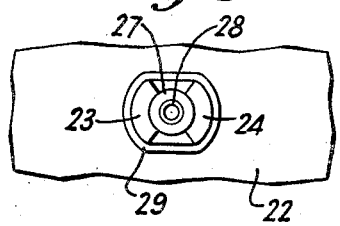
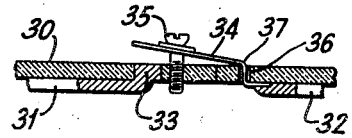
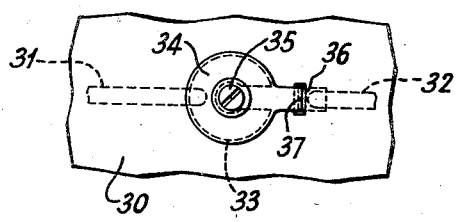
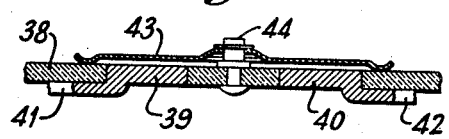
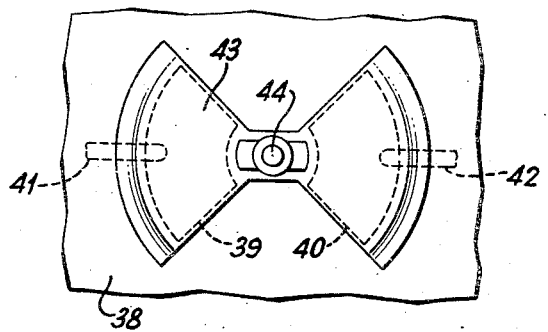
INVENTORS
EDUARD MARIA HENRICUS LIPS,
JOHANNES NATHANAEL HIENSCH,
ALEXANDRE HOROWITZ,
HENRI BLOK AND
PIETER HENDRIK JOHANNES BROUWER
BY
ATTORNEY.

Patented Dec. 15, 1942

2,305,355

UNITED STATES PATENT OFFICE 2,305,355

ELECTRICAL APPARATUS

Eduard Maria Henricus Lips, Johannes Nathanael Hiensch, Alexandre Horowitz, Henri Blok, and Pieter Hendrik Johannes Brouwer, Eindhoven, Netherlands, assignors, by mesne assignments, to Radio Corporation of America, New York, N. Y., a corporation of Delaware Application August 4, 1939, Serial No. 288,350
In Germany September 6, 1938

5 Claims. (Cl. 175—41.5)

This invention relates to improvements in or modifications of electric apparatus, for example, a radio receiving set comprising a conductor system made by a die-casting process disclosed and claimed in copending application, Serial No. 210,-803 filed May 28, 1938. In an advantageous form of construction of the conductor system according to the prior application the latter has formed on it by casting projections as, for example, tags forming a variable condenser.

The present invention relates to a particular form of construction of the variable condenser which is arranged in such a conductor system having projections.

According to the invention, at least one projection constitutes a stationary electrode of the condenser which is adapted for adjustment by means of members which are not cast to the wiring.

The condenser according to the invention offers the advantage that the cast-on projections need not be deformed for the purpose of adjusting the condenser so that substantially simpler and more reliable adjustment of the capacity is obtained, while, moreover, such a form or arrangement of the projections can be chosen that the latter are very rigid per se so that thrusts or the like will not exercise any influence on the value of the adjusted capacity.

The movably arranged electrode of the condenser may also be made by die-casting. For the purpose of adjusting the condenser-capacity preferably two electrodes cast to the wiring having a movable auxiliary electrode or a movable di-electric arranged between them.

An arrangement of the stationary electrode which is very advantageous in view of the rigidity of the cast-on elctrode is obtained when, in a conductor system supported by an insulating plate, the stationary electrode of the condenser fills up a recess in the insulating plate.

In order that the invention may be clearly understood and readily carried into effect it will now be described more fully with reference to the accompanying drawings, wherein Figs. 1, 3, 5, 7 and 9 illustrate in cross section various forms of construction of condensers embodying this invention, and Figs. 2, 4, 6, 8 and 10 are respectively plan views of the condensers shown in the first mentioned figures.

Referring to Figures 1 and 2, I designates a part of an insulating plate by which a conductor system produced by die-casting is supported. In view of the wiring only one of the leads 2 of the condenser is shown. The condenser comprises a cylindrical projection 5 cast to the lead 2 and constituting the stationary electrode of the condenser and a movable electrode 4. The movable electrode is adapted to rotate on a threaded shaft 7. The connecting lead for the movable electrode 4 is connected by soldering to the head of the shaft 7.

For the purpose of obtaining electrically irreproachable contact between the movable electrode 4 and the shaft 7, the electrode is provided with blocks 8 by which a wire spring 8' is forced against the thread of the shaft 7.

For the purpose of ensuring satisfactory attachment, the stationary electrode 5 is provided with a projection 3 which fills a recess in the insulating plate 1 and extends beyond the edge of the recess on the side of the insulating plate remote from the electrode 5. The lead 2, the projection 3 and the electrode 5 have all been produced simultaneously by die-casting. Thus, as may be seen from Fig. 1 in particular, the projection 3 and the electrode 5 form part of the lead 2. The projection also serves for attachment of the shaft 7, which is surrounded by a small tube 6 of ceramic material, since, during the die-casting operation, the metal of the projection 3 closely engages the external wall of the tube and thus fills any unevennesses of its surface. If necessary, the external wall of the tube 6 may also have formed in it grooves or recesses preventing any axial displacement. The movable electrode 4 and the shaft 7 may be made in any manner known per se but they are preferably also made by die-casting. For this purpose use may be made of a separate casting matrix, it being advantageous to use as such the matrix employed for the conductor system by forming recesses corresponding to the shaft of the movable electrode and of the shaft in the matrix at a free point, that is to say at a point at which recesses for the conductor system and the associated projections are not formed. The latter course offers the advantage that the matrix is utilised more efficiently and also avoids the need for separate steps of operation for the manufacture of the movable electrode and the shaft of the condenser.

Figs. 3 and 4 show a favorable form of construction of a condenser according to the invention in which two stationary electrodes 11 and 12 are attached to an insulating plate 10 and are cast to leads 13 and 14 respectively. As may be seen from Fig. 4, the outer stationary electrode 11 is cylindrical, whereas the two inner stationary electrodes 12 are semi-cylindrical. The capacity of the condenser is adjusted by means of an auxiliary electrode 15 which is carried upon the outer electrode and is electrically connected thereto. The auxiliary electrode 15 is formed substantially by two semi-cylindrical parts which may be moved by rotation between the parts of the stationary electrode 12. The condenser shown in Figs. 3 and 4 is used with advantage at such points of the set for which screening of the condenser is required. In this case the outer stationary electrode 11 is earthed so far as high-frequencies are concerned and constitutes a screening of the condenser field, as may be seen from Fig. 3.

Figs. 5 and 6 are a sectional and a plan view respectively of a form of construction of the condenser according to the invention which is very simple from a constructional point of view. Similarly to the form of construction shown in Figs. 3 and 4, an insulating plate 16 has attached to it two stationary electrodes 17 and 18 cast to leads 19 and 20. The electrodes 17 and 18 are, however, segmental and a slidable dielectric 21 is arranged between the stationary electrodes 17 and 18 for the purpose of adjusting the capacity. The dielectric 21 is rod-shaped and is preferably made of a material poor in high-frequency losses and having a high dielectric constant 1, for example of ceramic titanium dioxide. The maximum capacity of the condenser shown in Figs. 5 and 6 is comparatively low.

Figs. 7 and 8 show a form of construction of a condenser whose maximum capacity for given external dimensions is substantially higher. The arrangement of the stationary electrodes 23 and 24, of the lead 25 and 26 and of the insulating plate 22 is similar to that shown in Figs. 5 and 6. The capacity is, however, adjusted by displacement of a small tube 27 of ceramic material poor in high-frequency losses whose inner wall is provided with a metal layer 28 constituting an auxiliary electrode, a so-called blind electrode. Since the wall thickness of the tube may be very small a comparatively high maximum capacity is obtained. The condenser is surrounded by a rubber ring causing pinching of the tube 27 between the stationary electrodes 23 and 24 so that flexible engagement of the stationary electrodes with the tube wall is obtained, as is desirable with a view of obtaining a capacity that may be as high as possible.

If, as may be necessary, for example, for radio receiving sets of the like, very great rigidity of the cast-on electrodes should be obtained, it is advantageous, in a conductor system supported by an insulating plate, to arrange the stationary electrode or electrodes of the condenser in a recess in the insulating plate, as shown in cross-sectional view and in plan view in Figs. 9, 10, 11, 12 respectively.

Referring to Figs. 9 and 10, 30 designates a part of an insulating plate by which the conductor system is supported. In view of the conductor system only the leads 31 and 32 of the condenser are shown. The lead 31 has cast to it a projection 33 which constitutes the stationary electrode of the condenser. This electrode 33 fills a circular arc-shaped recess in the insulated plate. For the purpose of obtaining better attachment, the edge of the electrode 33 may be, for example, V-shaped but this is generally unnecessary when the metal is pressed at a comparatively high pressure into the matrix and correspondingly into the recess in the insulating plate, since in this case the metal fills any unevennesses of the edge of the recess and thus readily adheres in the recess. Since the entire periphery of the electrode engages the insulating plate a very great rigidity of the electrode is obtained. The capacity is adjusted by means of a movable electrode 34 constituted by a resilient metal strip. Rotation of a screw 35 secured in the insulating plate 30 has the effect of altering the distance between the electrodes 33 and 34. The electrode 34, whose form corresponds substantially with that of the electrode 33, is provided with a connecting strip 37 which is passed through an aperture 36 in the insulating plate and which is surrounded at its end by the cast lead 32.

Figs. 11 and 12 show a further form of construction of the condenser. An insulated plate 38 has formed in it two sector-shaped recesses which are filled by two stationary electrodes 39 and 40 of the condenser. The stationary electrodes 39 and 40 are cast to leads 41 and 42 of the condenser and have arranged between them a movable auxiliary electrode 43 which comprises two sector-shaped parts and is journalled on a shaft 44. The capacity can be adjusted by rotation of the movable electrode 43.

Although several forms of construction have been described herein, it is, however, obvious that many other forms of construction embodying the present invention are possible in addition to those shown and those preferred.

What we claim is:

1. In a variable condenser, a fixed plate-shaped electrode formed by die-casting, an insulating base in the form of a flat plate of substantially the same thickness as the electrode serving as a support for the condenser and having an aperture similarly shaped as the fixed electrode, said fixed electrode being contained entirely within the base plate aperture, and a conductor die-cast integrally with the fixed electrode extending along one of the surfaces of the base plate.

2. In a variable condenser, an insulating base in the form of a flat plate serving as a support for the condenser, said base plate being provided with an aperture which extends through the entire thickness of the base plate, a fixed electrode embedded within and occupying the entire space of said aperture, and a conductor die-cast integrally with the fixed electrode extending along one of the surfaces of the base plate.

3. In a variable condenser, an insulating base in the form of a flat plate serving as a support for the condenser, said base plate being provided with an aperture which extends through the entire thickness of the base plate, a fixed plate-shaped electrode of substantially the same thickness as the base plate embedded by die-casting within and occupying the entire space of said aperture, and a conductor die-cast integrally with the fixed electrode extending along one of the surfaces of the base plate.

4. The construction defined in claim 3 wherein the fixed electrode and the base plate aperture are of circular formation.

5. The construction defined in claim 3 wherein the fixed electrode and the base plate aperture are sector-shaped.

EDUARD MARIA HENRICUS LIPS.
JOHANNES NATHANAEL HIENSCH.
ALEXANDRE HOROWITZ.
HENRI BLOK.
PIETER HENDRIK
        JOHANNES BROUWER.